(12) United States Patent
Ono et al.

(10) Patent No.: US 7,406,374 B2
(45) Date of Patent: Jul. 29, 2008

(54) STEERING RATIO CONTROL SYSTEM OF VEHICLE

(75) Inventors: Hitoshi Ono, Kanagawa (JP); Hajime Kosaka, Tochigi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 544 days.

(21) Appl. No.: 11/077,226

(22) Filed: Mar. 11, 2005

(65) Prior Publication Data

US 2005/0209752 A1 Sep. 22, 2005

(30) Foreign Application Priority Data

Mar. 19, 2004 (JP) ............... 2004-079840

(51) Int. Cl.
*A01B 69/00* (2006.01)
*B60S 9/00* (2006.01)

(52) U.S. Cl. .................. 701/41; 180/197; 180/204; 180/6.2; 180/400; 180/443; 701/42; 701/69; 701/71; 701/79

(58) Field of Classification Search .................. 701/41, 701/65, 68, 69, 71, 72, 79, 91, 43, 44, 82–84; 180/443, 197, 204, 6.2, 6.24, 6.38, 400, 416.419, 180/422, 412, 447

See application file for complete search history.

(56) References Cited

U.S. PATENT DOCUMENTS 5,181,173 A * 1/1993 Avitan ................. 701/42

6,032,755 A 3/2000 Blandino et al.
6,154,696 A 11/2000 Nishi et al.
7,065,436 B2 * 6/2006 Hara ........................ 701/41

FOREIGN PATENT DOCUMENTS

| DE | 197 51 125 A1 | 9/1998 |
| EP | 1 304 276 A1 | 4/2003 |
| IT | 0548854 A1 * | 6/1993 |
| JP | 09-207802 A | 8/1997 |
| JP | 11-129927 A | 5/1999 |
| JP | 02002037113 A * | 2/2002 |

* cited by examiner

*Primary Examiner*—Khoi H. Tran
*Assistant Examiner*—Bhavesh Amin
(74) *Attorney, Agent, or Firm*—Foley & Lardner LLP

(57) ABSTRACT

A steering ratio control system of a vehicle includes a variable steering ratio mechanism variably adjusting a steering ratio of a steer angle at left and right steered road wheels to a steering-wheel rotation angle, and a braking/driving force control unit individually controlling braking force and/or driving force of the left and right steered wheels. A steering ratio control unit determines a reference steering ratio based on a vehicle's driving state. The steering ratio control unit calculates a steering-ratio correction value needed for canceling torque steer resulting from a difference in braking force and/or driving force between the left and right steered wheels. A final steering ratio is determined based on both of the reference steering ratio and the steering-ratio correction value to drive the variable steering ratio mechanism responsively to the final steering ratio reflecting the steering-ratio correction value.

15 Claims, 8 Drawing Sheets

LEFT-AND-RIGHT DRIVING FORCE DIFFERENCE

TIME

STEERING REACTION TORQUE

TIME

STEERING-WHEEL ROTATION ANGLE

STEERING RATIO CONTROL SYSTEM USING REFERENCE STEERING RATIO CHARACTERISTIC

1ST MODIFIED STEERING RATIO CONTROL SYSTEM

TIME

FIG.10A
TOTAL DRIVING FORCE OF LEFT AND RIGHT STEERED WHEELS

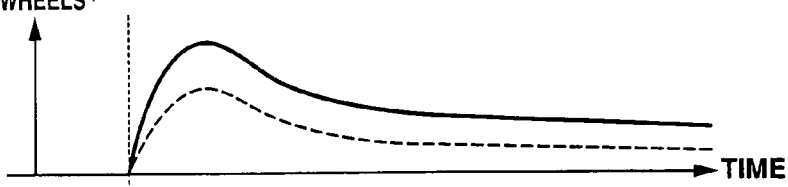

TIME

FIG.10B
LEFT-AND-RIGHT DRIVING FORCE DIFFERENCE

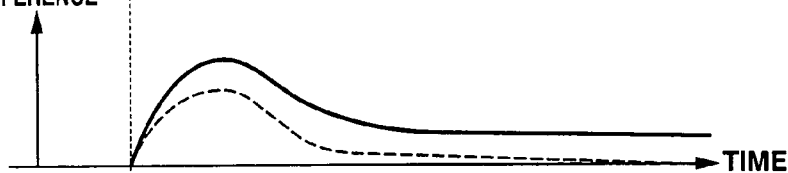

TIME

FIG.10C
STEERING REACTION TORQUE

TIME

FIG.10D
STEERING-WHEEL ROTATION ANGLE

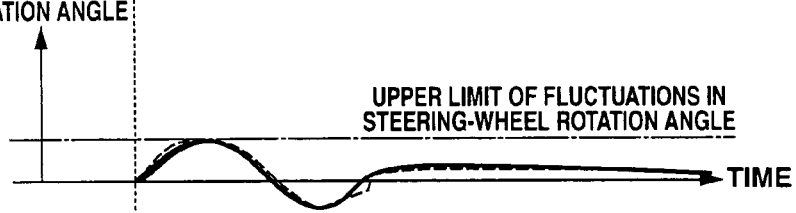

UPPER LIMIT OF FLUCTUATIONS IN STEERING-WHEEL ROTATION ANGLE

TIME

FIG.10E

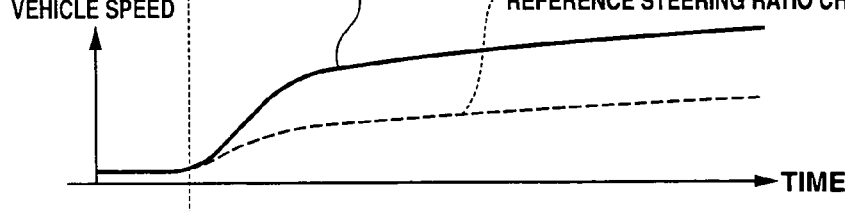

2ND MODIFIED STEERING RATIO CONTROL SYSTEM
STEERING RATIO CONTROL SYSTEM USING REFERENCE STEERING RATIO CHARACTERISTIC
VEHICLE SPEED

TIME

STEERING RATIO CONTROL SYSTEM OF VEHICLE

TECHNICAL FIELD

The present invention relates to a steering ratio control system of a vehicle capable of variably controlling a steering ratio of a steered-road-wheel movement (a steer angle at steered road wheels) to a steering-wheel movement (a steering-wheel rotation angle), and specifically to a system capable of compensating for torque steer in steered road wheels.

BACKGROUND ART

In most front wheel drive vehicles, a phenomenon known as "torque steer" is experienced. Torque steer is a vehicle steering effect resulting from a difference in braking force (braking torque) and/or driving force (traction or driving torque) between left and right steered road wheels. In order to eliminate or cancel the torque steer effect, a steering torque value resulting from torque steer must be compensated for. Generally, on automotive vehicles employing electric power steering devices, torque steer is compensated for by summing the steering torque value corresponding to torque steer to a steering assistance torque command value, thus effectively suppressing an undesirable steering-wheel pull (steering-wheel pulling power) in clockwise or anticlockwise directions, that is, positive or negative fluctuations in steering-wheel rotation angle occurring owing to torque steer. Such torque-steer compensation technologies have been disclosed in U.S. Pat. No. 6,154,696 (corresponding to Japanese Patent Provisional Publication No. 11-129927) and U.S. Pat. No. 6,032,755 (corresponding to Japanese Patent Provisional Publication No. 9-207802). As is generally known, in heavy vehicles employing high-power engines, there is an increased tendency for torque steer to occur. However, assuming that the previously-discussed electric-power-steering device equipped torque-steer compensation system, which uses a summed value of a steering assistance torque command value and a steering torque value required to cancel torque steer, is applied to such heavy vehicles, there are several drawbacks, such as a lack of steering assistance torque owing to the limited line-source voltage, a large-sized electric motor, or an increased weight of the electric power steering device. Thus, an electric power steering device is unsuitable to heavy vehicles employing high-power engines. On automotive vehicles employing braking/driving force control systems (or active torque split control systems) capable of individually controlling braking force and/or driving force between left and right road wheels, when there is an excessive difference in driving force between left and right steered road wheels, the control system generally acts to limit or decreasingly compensate for the engine power output (corresponding to the summed torque value of driving torque applied to the left steered wheel and driving torque applied to the right steered wheel) in order to avoid the torque steer from excessively develop. This deteriorates the acceleration performance.

SUMMARY OF THE INVENTION

Accordingly, it is an object of the invention to provide a steering ratio control system of a vehicle, capable of reconciling two contradictory requirements, that is, a reduction in a steering-wheel pull arising from torque steer and an enhanced acceleration performance.

In order to accomplish the aforementioned and other objects of the present invention, a steering ratio control system of a vehicle comprises a variable steering ratio mechanism that variably adjusts a steering ratio of a steer angle at left and right steered road wheels to a rotation angle of a steering wheel, a braking/driving force control unit that individually controls braking force and/or driving force of the left and right steered road wheels, a steering ratio control unit comprising a steering ratio decision section that determines a reference steering ratio based on a driving state of the vehicle, a variable steering ratio mechanism driving section that drives the variable steering ratio mechanism depending on the reference steering ratio based on the vehicle's driving state, and a steering-ratio correction value arithmetic-calculation section that calculates a steering-ratio correction value needed for canceling torque steer resulting from a difference in braking force and/or driving force between the left and right steered road wheels, and the variable steering ratio mechanism driving section determining a final steering ratio based on both of the reference steering ratio and the steering-ratio correction value to drive the variable steering ratio mechanism responsively to the final steering ratio.

According to another aspect of the invention, a steering ratio control system of a vehicle comprises a variable steering ratio mechanism for variably adjusting a steering ratio of a steer angle at left and right steered road wheels to a rotation angle of a steering wheel, braking/driving force control means for individually controlling braking force and/or driving force of the left and right steered road wheels, steering ratio control means comprising steering ratio decision means for determining a reference steering ratio based on a driving state of the vehicle, variable steering ratio mechanism driving means for driving the variable steering ratio mechanism depending on the reference steering ratio based on the vehicle's driving state, and steering-ratio correction value arithmetic-calculation means for calculating a steering-ratio correction value needed for canceling torque steer resulting from a difference in braking force and/or driving force between the left and right steered road wheels, and the variable steering ratio mechanism driving means determining a final steering ratio based on both of the reference steering ratio and the steering-ratio correction value to drive the variable steering ratio mechanism responsively to the final steering ratio.

According to a further aspect of the invention, a method of controlling a steering ratio of a vehicle employing a variable steering ratio mechanism capable of variably adjusting the steering ratio of a steer angle at left and right steered road wheels to a rotation angle of a steering wheel, and a braking/driving force control unit capable of individually controlling braking force and/or driving force of the left and right steered road wheels, the method comprising determining a reference steering ratio based on a driving state of the vehicle, calculating a steering-ratio correction value needed for canceling torque steer resulting from a difference in braking force and/or driving force between the left and right steered road wheels, determining a final steering ratio based on both of the reference steering ratio and the steering-ratio correction value, and driving the variable steering ratio mechanism responsively to the final steering ratio.

According to a still further aspect of the invention, a method of controlling a steering ratio of a vehicle employing a variable steering ratio mechanism capable of variably adjusting the steering ratio of a steer angle at left and right steered road wheels to a rotation angle of a steering wheel, and a braking/driving force control unit capable of individually controlling braking force and/or driving force of the left and right steered road wheels, the method comprising determining a reference steering ratio based on both of a vehicle speed and the steering-wheel rotation angle, determining, based on wheel speeds of the left and right steered road wheels, a difference in braking force and/or driving force between the left and right steered road wheels, calculating a steering-ratio correction value needed for canceling torque steer resulting from the difference in braking force and/or driving force between the left and right steered road wheels, determining a final steering ratio based on both of the reference steering ratio and the steering-ratio correction value, and driving the variable steering ratio mechanism responsively to the final steering ratio.

The other objects and features of this invention will become understood from the following description with reference to the accompanying drawings.

BRIEF DESCRIPTION OF THE DRAWINGS

FIGS. 10A-10E are time charts explaining the operation and effects obtained by the other modified system shown in FIG. 9.

DESCRIPTION OF THE PREFERRED EMBODIMENTS

Figure 1:
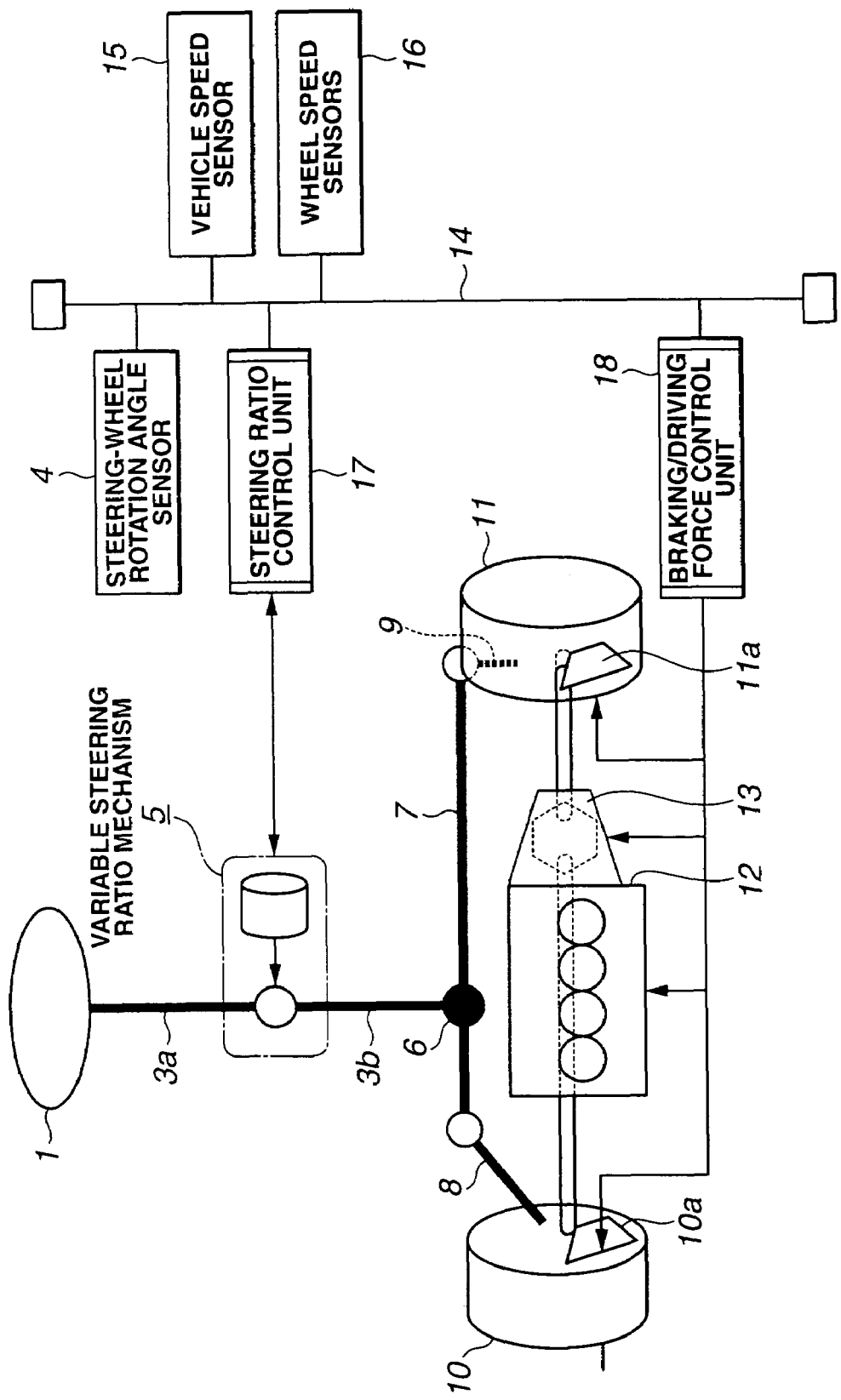
FIG. 1 is a system block diagram illustrating an embodiment of an automotive steering ratio control system.

Referring now to the drawings, particularly to FIG. 1, the steering ratio control system of the embodiment is exemplified in a front wheel drive vehicle employing a transversely-arranged engine and automatic transmission, exactly a transversely-arranged engine and automatic transaxle 12. The steering ratio control system of the embodiment employs both of a steering ratio control unit 17 (described later) provided to control a variable steering ratio mechanism 5 (described later) and a braking/driving force control unit 18 (described later) capable of performing engine output control, driving force distribution control between left and right steered road wheels 10 and 11, and braking force distribution control between left and braking/driving force control unit 18 functions to individually control braking force and/or driving force of left and right steered road wheels 10 and 11.

As shown in FIG. 1, a steering wheel 1 (steering input means) is fixedly connected to the upper end of an upper column shaft 3a in the driver's compartment. A pinion 6 is formed integral with the lower end of a lower column shaft 3b. A rack shaft 7 is in meshed-engagement with pinion 6 so as to construct a rack-and-pinion steering gear. Rack shaft 7, which is the major cross member of the steering linkage, is located on the front end of the automotive vehicle. In a conventional manner, rack shaft 7 is slidably accommodated in its rack housing, such that, when the steering wheel 1 and upper and lower column shafts 3a and 3b are turned for steering, pinion 6 causes rack shaft 7 to move to the left or right in the rack housing. The leftmost end of rack shaft 7 is mechanically linked via a left tie rod 8 to the front-left steered road wheel 10, whereas the rightmost end of rack shaft 7 is mechanically linked via a right tie rod 9 to the front-right steered road wheel 11. Power (driving torque) flows from the transversely-arranged engine and automatic transaxle 12 via a differential gear assembly 13 to front-left and front-right steered wheels 10 and 11.

In the steering ratio control system of the embodiment shown in FIGS. 1-6C, an addition-type variable steering ratio mechanism (a summing variable steering ratio mechanism) is used as variable steering ratio mechanism 5. Variable steering ratio mechanism 5 is provided between upper and lower column shafts 3a and 3b and has a brushless direct-current (DC) geared motor with a reduction gear box. In the addition-type variable steering ratio mechanism, a rotation angle of pinion 6, in other words, a rotation angle of lower column shaft 3b is determined as a summed value, which is obtained by adding (i) a motor rotation angle of the motor shaft of the geared motor of variable steering ratio mechanism 5 to (ii) a rotation angle θs of steering wheel 1 turned by the driver, that is, a rotation angle of upper column shaft 3a. The rotation angle of pinion 6, that is, the rotation angle of lower column shaft 3b is in direct-correlation with the steer angle at the steered road wheels. The motor rotation angle (assisted steering-wheel angle) of the motor shaft of the geared motor of the addition-type variable steering ratio mechanism is determined based on a reference steering ratio, which is determined based on a vehicle speed value V. That is to say, the final steering ratio of the steered-road-wheel movement (the steer angle at the steered road wheels, substantially corresponding to the pinion rotation angle) to the steering-wheel movement (steering-wheel rotation angle θs) can be variably controlled or adjusted depending on the summed value of (i) the motor rotation angle (assisted steering-wheel angle) determined based on the reference steering ratio based on vehicle speed V and (ii) steering-wheel rotation angle θs.

Each of the previously-noted steering ratio control unit 17 and braking/driving control unit 18 generally comprises a microcomputer. Each of steering ratio control unit 17 and braking/driving control unit 18 includes an input/output interface (I/O), memories (RAM, ROM), and a microprocessor or a central processing unit (CPU). The input/output interface (I/O) of each of steering ratio control unit 17 and braking/driving control unit 18 receives input information from various engine/vehicle sensors, namely a steering-wheel rotation angle sensor 4, a vehicle speed sensor 15, and wheel speed sensors 16. Steering-wheel rotation angle sensor 4 is provided to detect steering-wheel rotation angle θs. Vehicle speed sensor 15 is provided to detect or monitor or estimate vehicle speed V. For instance, a rotational speed of the output shaft of engine and automatic transaxle 12 is often used to estimate vehicle speed V. Wheel speed sensors 16 are provided for detecting respective wheel speeds $Vw_{FL}$, $Vw_{FR}$, $Vw_{RL}$, and $Vw_{RR}$ of front-left road wheel 10, front-right road wheel 11, and rear-left and rear-right road wheels (not shown). Front-left, front-right, rear-left and rear-right wheel speeds $Vw_{FL}$, $Vw_{FR}$, $Vw_{RL}$, and $Vw_{RR}$ are collectively referred to as "Vwi". Each of steering ratio control unit 17 and braking/driving force control unit 18 is electronically connected or linked via a communication bus 14 (a plurality of signal lines) to each of steering-wheel rotation angle sensor 4, vehicle speed sensor 15, and wheel speed sensors 16. Within steering ratio control unit 17, the central processing unit (CPU) allows the access by the I/O interface of input informational data signals from the previously-discussed engine/vehicle sensors 4 and 15 and input information concerning the left-and-right braking/driving force difference from braking/driving force control unit 18. The CPU of steering ratio control unit 17 is responsible for carrying the steering ratio control program stored in memories and is capable of performing necessary arithmetic and logic operations. Computational results (arithmetic calculation results, that is, calculated output signals) are relayed through the output interface circuitry of steering ratio control unit 17 to an output stage, namely variable steering ratio mechanism 5. As described later, the output interface of steering ratio control unit 17 is electrically connected to variable steering ratio mechanism 5 to control the same based on steering-wheel rotation angle θs and vehicle speed V. On the other hand, within braking/driving control unit 18, the central processing unit (CPU) allows the access by the I/O interface of input informational data signals from the previously-discussed engine/vehicle sensors, concretely, wheel speed sensors 16. The CPU of braking/driving control unit 18 is responsible for carrying the braking/driving force control program stored in memories and is capable of performing necessary arithmetic and logic operations. Computational results (arithmetic calculation results, that is, calculated output signals) are relayed through the output interface circuitry of braking/driving control unit 18 to output stages, namely a driving force distribution control system and a braking force distribution control system including electronically-controlled left and right brake actuators 10a and 11a associated with the respective steered wheels 10 and 11. As described later, the output interface of braking/driving force control unit 18 is electronically connected to both of the driving force distribution control system and the braking force distribution control system so as to control all of engine power output, left-and-right driving force distribution between front-left and front-right steered wheels 10 and 11, and left-and-right braking force distribution between front-left and front-right steered wheels 10 and 11, responsively to wheel speeds Vwi detected. Also, the output interface of braking/driving force control unit 18 is electronically connected via the input interface of steering ratio control unit 17 to a steering-ratio correction value arithmetic calculation section 17b (described later) so as to cancel or compensate for a steering-torque component resulting from torque steer occurring owing to the difference in braking force and/or driving force between left and right steered wheels 10 and 11 by way of compensation for the steering ratio.

Figure 2:
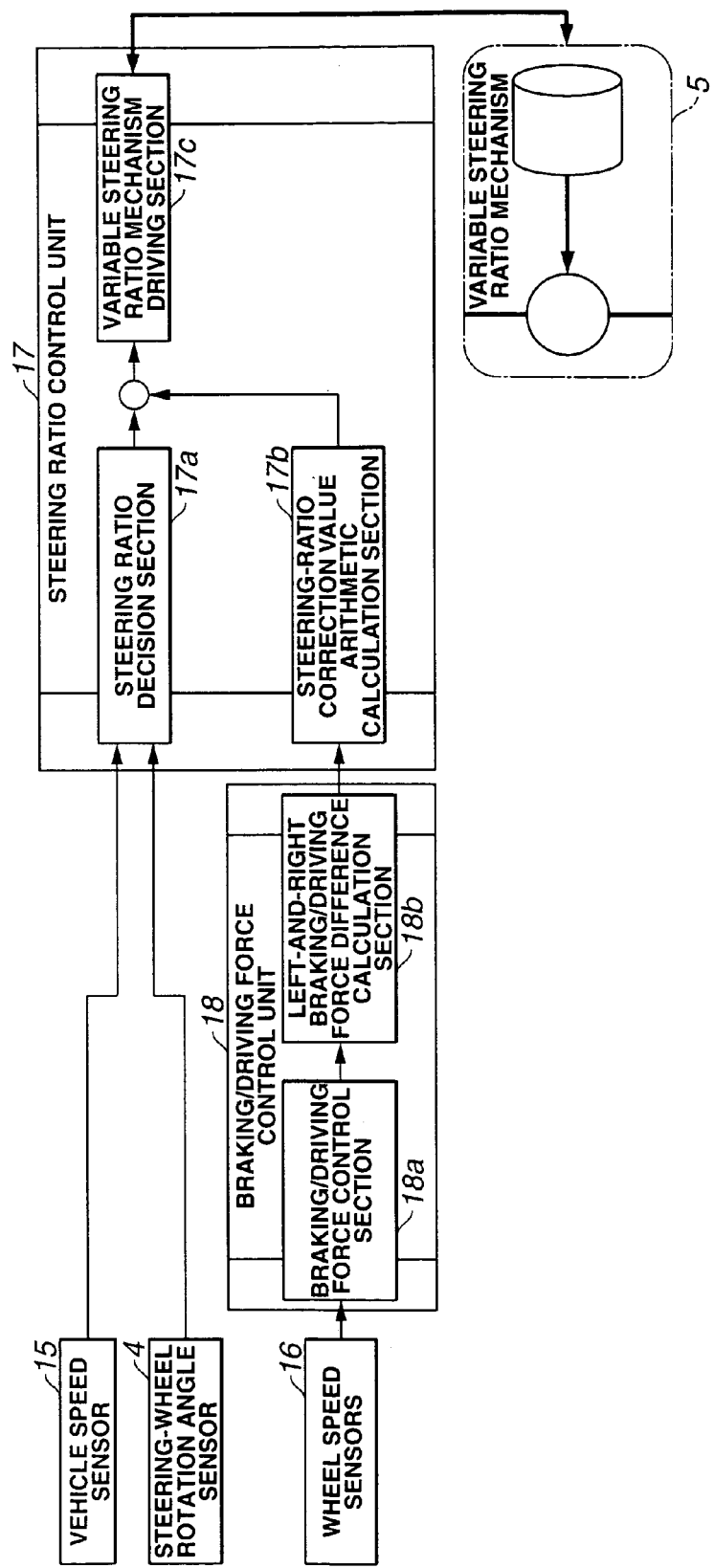
FIG. 2 is a control block diagram of the steering ratio control system employing both a steering ratio control unit and a braking/driving force control unit.

Referring now to FIG. 2, there is shown the control block diagram concerning both of steering ratio control unit 17 and braking/driving force control unit 18. The processor of steering ratio control unit 17 is comprised of a reference steering ratio decision section (simply, a steering ratio decision section 17a), a steering-ratio correction value arithmetic calculation section 17b, and a variable steering ratio mechanism driving section 17c. Steering ratio decision section 17a determines, based on a vehicle's driving state, a reference steering ratio. Concretely, steering ratio decision section 17a calculates or retrieves, based on at least the latest up-to-date information concerning vehicle speed V, a reference steering ratio from a predetermined vehicle-speed versus reference steering-ratio characteristic diagram indicated by the broken lines in FIG. 5. In the predetermined vehicle-speed versus reference steering-ratio characteristic diagram indicated by the broken line in FIG. 5, the highest-gradient steering ratio characteristic indicates a lowest vehicle-speed reference steering-ratio characteristic, whereas the lowest-gradient steering ratio characteristic indicates a high vehicle speed reference steering-ratio characteristic. In order to estimate a reference steering-ratio characteristic corresponding to an intermediate vehicle speed value between the lowest vehicle speed and the high vehicle speed, a process of interpolation is used. As can be seen from the predetermined vehicle-speed versus reference steering-ratio characteristic diagram indicated by the broken lines in FIG. 5, in a low and middle speed range, a steering ratio is comparatively great, to ensure a quick steering response, thus providing a light and good steering feel and ensuring a greater maneuverability of the vehicle. In a high speed range, a steering ratio is comparatively small to provide a slow steering response, thus providing a moderate and stable steering feel. As discussed above, setting of the vehicle speed versus reference steering ratio characteristics indicated by the broken lines in FIG. 5 balances or reconciles two contradictory requirements, namely a light and good steering feel in the low- and mid-speed range and a moderate and stable steering feel in a high-speed range. Steering-ratio correction value arithmetic-calculation section 17b arithmetically calculates a steering-ratio correction value needed to cancel torque steer resulting from a difference in braking force and/or driving force between left and right steered wheels 10 and 11. Variable steering ratio mechanism driving section 17c receives a summed value of computation results from both of steering ratio decision section 17a and steering-ratio correction value arithmetic-calculation section 17b, and determines or sets the summed value of the reference steering ratio determined by steering ratio decision section 17a and the steering-ratio correction value calculated by steering-ratio correction value arithmetic-calculation section 17b as a final steering ratio. Variable steering ratio mechanism driving section 17c outputs a control command signal indicative of the final steering ratio to variable steering ratio mechanism 5, so that variable steering ratio mechanism 5 is driven responsively to the final steering ratio that reflects the steering-ratio correction value corresponding to a torque-steer cancellation torque.

On the other hand, the processor of braking/driving force control unit 18 is comprised of a braking/driving force control section 18a and a left-and-right braking/driving force difference arithmetic calculation section 18b. Braking/driving force control section 18a is responsive to the latest up-to-date information concerning wheel speeds Vwi ($Vw_{FL}$, $Vw_{FR}$, $Vw_{RL}$, $Vw_{RR}$) so as to control all of engine power output, driving force distribution between front-left and front-right steered wheels 10 and 11, and braking force distribution between front-left and front-right steered wheels 10 and 11. Left-and-right braking/driving force difference arithmetic calculation section 18b calculates or determines, based on the latest up-to-date information concerning wheel speeds Vwi, a difference in braking force and/or driving force between left and right steered wheels 10 and 11, which difference is produced during the braking/driving force control. Information about the left-and-right braking force difference and/or the left-and-right driving force difference is input into steering-ratio correction value arithmetic calculation section 17b of steering ratio control unit 17.

Figure 3:
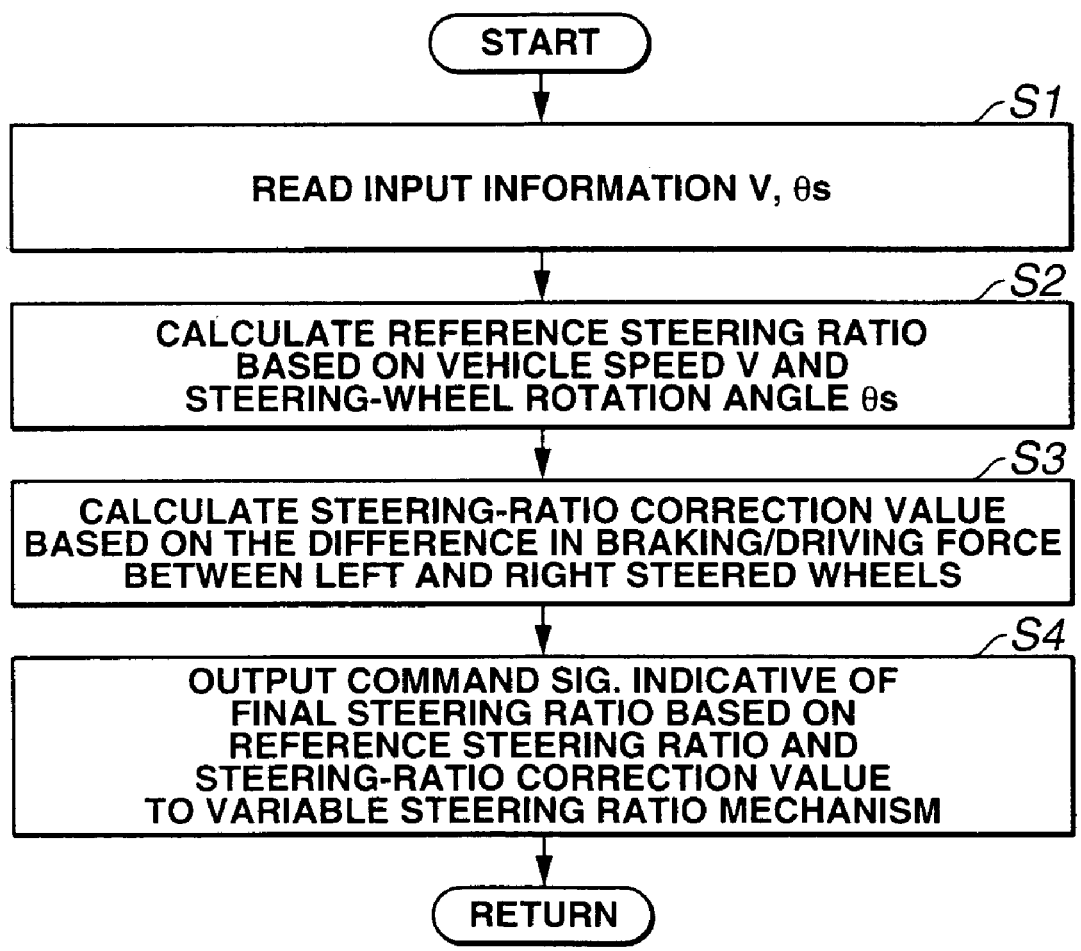
FIG. 3 is a flow chart showing a steering ratio control routine executed within the steering ratio control unit incorporated in the system of the embodiment.

Referring now to FIG. 3, there is shown the steering ratio control routine executed within steering ratio control unit 17. The steering ratio control routine shown in FIG. 3 is executed as time-triggered interrupt routines to be triggered every predetermined sampling time intervals such as 10 milliseconds.

At step S1, the latest up-to-date information concerning steering-wheel rotation angle θs detected by steering-wheel rotation angle sensor 4 and vehicle speed V detected by vehicle speed sensor 15 is read.

Figure 5:
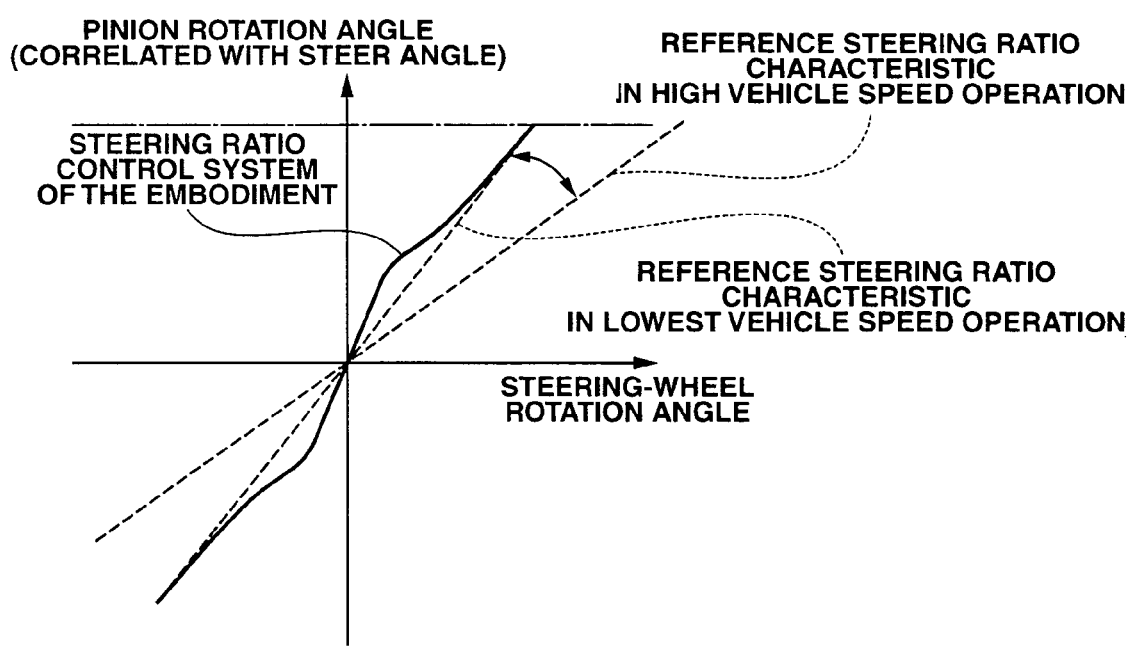
FIG. 5 is a steering-ratio characteristic diagram showing a preprogrammed vehicle-speed dependent reference steering-ratio characteristic and a compensated steering-ratio characteristic curve obtained by the steering ratio control system of the embodiment with an addition-type variable steering ratio mechanism.

At step S2, within steering ratio decision section 17a, the reference steering ratio is calculated or retrieved based on the latest up-to-date information concerning vehicle speed V and steering-wheel rotation angle θs from the predetermined vehicle-speed versus reference steering-ratio characteristic indicated by the broken line in FIG. 5.

Figure 4:
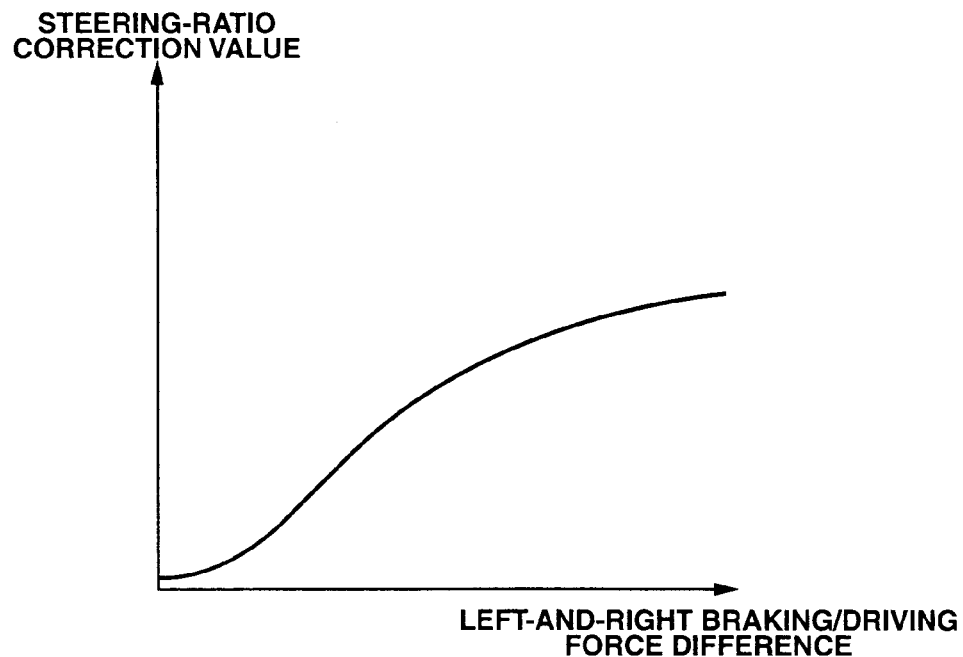
FIG. 4 is a left-and-right braking/driving force difference versus steering-ratio correction value characteristic curve.

At step S3, within steering-ratio correction value arithmetic calculation section 17b, a steering-ratio correction value is calculated based on the calculated braking/driving force difference between left and right steered wheels 10 and 11. In the shown embodiment, when calculating the steering-ratio correction value by steering-ratio correction value arithmetic calculation section 17b, a predetermined left-and-right braking/driving force difference versus steering-ratio correction value characteristic diagram shown in FIG. 4 is used. As can be seen from the predetermined left-and-right braking/driving force difference versus steering-ratio correction value characteristic curve of FIG. 4, when the left-and-right braking/driving force difference is small, the steering-ratio correction value is also small. The steering-ratio correction value is set to increase, as the left-and-right braking/driving force difference increases.

At step S4, variable steering ratio mechanism driving section 17c receives the summed value of computation results output from both of steering ratio decision section 17a and steering-ratio correction value arithmetic calculation section 17b, and determines the summed value of the reference steering ratio determined by steering ratio decision section 17a and the steering-ratio correction value calculated by steering-ratio correction value arithmetic calculation section 17b as the final steering ratio at which the properly assisted steer angle can be provided, while suppressing torque steer. At the same time, at step S4, a command signal indicative of the final steering ratio, determined based on the computed reference steering ratio and the computed steering-ratio correction value, is output to variable steering ratio mechanism 5.

After step S4, the steering ratio control routine returns to the main program.

That is to say, when at least one of the left-and-right braking force difference and the left-and-right driving force difference occurs, the steering-ratio correction value is calculated or retrieved based on the braking/driving force difference through step S3 from the predetermined left-and-right braking/driving force difference versus steering-ratio correction value characteristic diagram of FIG. 4. Then, the reference steering ratio, retrieved through step S2, is compensated for based on the steering-ratio correction value obtained through step S3. Thereafter, at step S4, the final steering ratio higher than the reference steering ratio calculated through step S2 can be set (see the compensated vehicle-speed versus steering ratio characteristic curve indicated by the solid line in FIG. 5). As a result of this, an inverted ratio of the steering ratio, that is, a ratio of steering-wheel movement (steering-wheel rotation angle) to steered-road-wheel movement (steer angle at steered road wheels) becomes smaller, thereby effectively suppressing an undesirable steering-wheel pull (steering-wheel pulling power) in clockwise or anticlockwise directions, that is, positive or negative fluctuations in steering-wheel rotation angle θs occurring owing to torque steer.

[Steering-ratio Compensating Action Executed Responsively to Torque Steer]

As is generally known, when an automotive vehicle with a high-power engine starts quickly, a phenomenon known as "torque steer", in other words, an undesirable steering-wheel pull (steering-wheel pulling power) in clockwise or anti-clockwise directions is often experienced owing to at least two major causes, that is, the difference in tractive force from side to side when torque developed by the engine is transferred unevenly to front steered wheels 10 and 11, and the difference in road-surface friction factor, denoted by Greek letter μ, between the road surfaces on which the respective steered wheels are traveling. On vehicles employing electric power steering devices, torque steer (or undesirable steering-wheel pull) is generally compensated for or suppressed by adding a steering torque value (in other words, a torque-steer cancellation torque value) required to cancel torque steer to a steering assistance torque command value. However, there is an increased tendency for torque steer to occur in automotive vehicles employing high-power engines. Generally, the weight of such a vehicle with a high-power engine is heavy, and therefore there is a problem of a lack in steering assistance torque owing to the limited line-source voltage. That is, such an electric power steering device is unsuitable to such a heavy vehicle with a high-power engine. From the viewpoint of a safety countermeasure as well as a "torque steer" countermeasure, an automotive vehicle employing a large-displacement engine is often equipped with a braking/driving force control system containing a traction control system (TCS), a vehicle dynamics control (VDC) system, an active torque-split control (ATC) system (or a left-and-right tractive force distribution control system), and the like. Even when such a braking/driving force control system (TCS, VDC, ATC) comes into operation, enhancing the vehicle starting-period acceleration performance generally requires a trade-off in torque steer (or in steering-wheel pull to clockwise or anticlockwise directions). In recent years, a variable steering ratio mechanism is often adopted or utilized to increase a maneuverability of the vehicle in a situation where the vehicle is put into the garage or the vehicle is turned to the right or left at the intersection point. Such a variable steering ratio mechanism is suitable to large-sized vehicles, and therefore the variable steering ratio mechanism is often combined with a hydraulic power steering system.

According to the steering ratio control system of the embodiment, it is possible to reconcile a reduction in an undesirable steering-wheel pull occurring owing to torque steer and an enhancement in acceleration performance, by utilizing or integratedly controlling braking/driving force control unit 18 and variable steering ratio mechanism 5 in combination, even in case of heavy vehicles to which electric power steering devices are unsuitable.

FIG. 5 shows an example of steering-ratio compensation action performed by the steering ratio control system of the embodiment. As can be seen from the compensated steering-ratio characteristic curve indicated by the solid line in FIG. 5, in the system utilizing the addition type variable steering ratio mechanism, it is possible to set a steering ratio characteristic higher than the lowest vehicle-speed reference steering-ratio characteristic. Thus, even during a vehicle starting period from a vehicle standstill state where the vehicle speed is 0 km/h, it is possible to effectively suppress an undesirable steering-wheel pull (steering-wheel pulling power) in clockwise or anticlockwise directions, that is, positive or negative fluctuations in steering-wheel rotation angle θs occurring owing to torque steer.

Figure 6A:
FIGS. 6A-6C are time charts explaining the operation and effects of the system of the embodiment shown in FIGS. 1-5.
Figure 6B:
Figure 6C:
Figure 7:
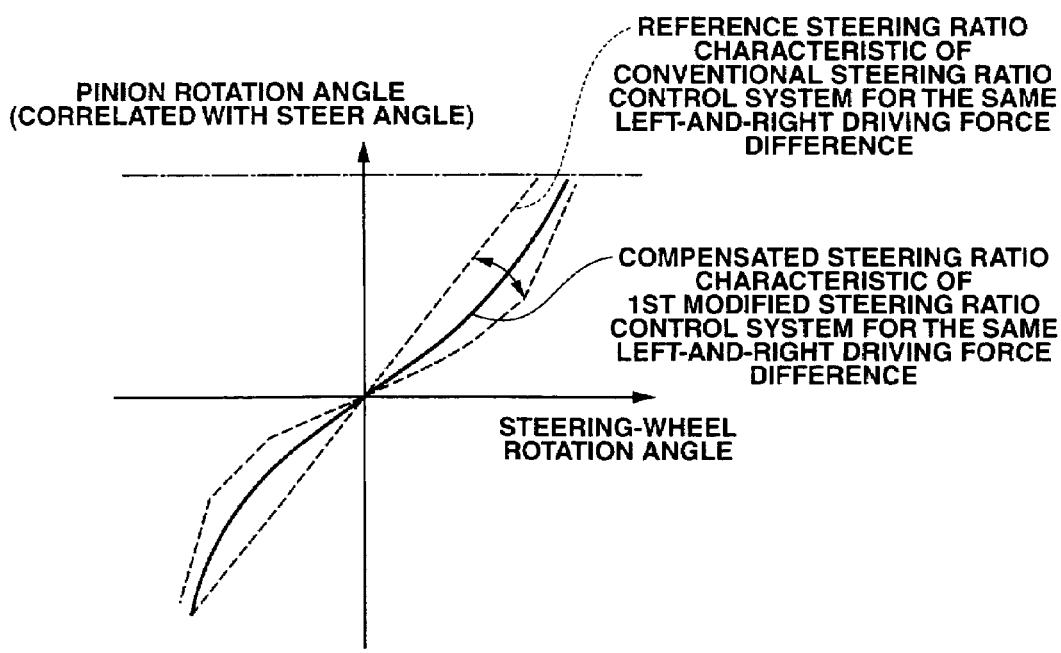
FIG. 7 is a modified steering-ratio characteristic diagram showing a modified steering-ratio characteristic curve obtained by a modified steering ratio control system with a multiplication-type variable steering ratio mechanism.

Referring now to FIGS. 6A-6C, there are shown time charts explaining the operation and effects of the system of the embodiment. In accordance with an increase in the difference in driving force between left and right steered wheels 10 and 11, the steering-ratio correction value can be set to a higher value (see the steering-ratio correction value characteristic curve of FIG. 4). Then, the summed value of (i) the reference steering ratio based on at least vehicle speed V (exactly, based on vehicle speed V and steering-wheel rotation angle θs) and (ii) the steering-ratio correction value based on the left-and-right braking/driving force difference, is set to the final steering ratio. In FIGS. 6A-6C, the time charts indicated by the solid line show simulation results obtained by the system of the embodiment, whereas the time charts indicated by the broken line show simulation results obtained by the conventional steering ratio control system using the reference steering ratio characteristic. As compared to the conventional steering ratio control system using a reference steering ratio characteristic itself, for the same steered-road-wheel movement (for the same steer angle at steered wheels 10 and 11), it is possible to decreasingly compensate for the steering-wheel angle (the steering-wheel movement), thus effectively suppressing the magnitude of undesirable steering-wheel pull (steering-wheel pulling power) in clockwise or anticlockwise directions, that is, positive or negative fluctuations in steering-wheel rotation angle occurring owing to torque steer (see FIG. 6C). In case of such an addition type variable steering ratio mechanism, when steering wheel 1 is held in a driver-applied steering state, a steering reaction force or a steering reaction torque (feedback torque through steering wheel 1) created during the steering-ratio compensating action initiated responsively to the occurrence of torque steer, is almost equal to a steering reaction force created by the conventional steering ratio control system using the reference steering ratio characteristic itself (see FIG. 6B). Thus, it is possible to provide the driver with a preferable steering feel substantially corresponding to the steering resistance (the feedback torque) through the steering wheel.

The steering ratio control system of the embodiment has the following effects (1)-(3).

(1) Steering ratio control unit 17 includes steering-ratio correction value arithmetic calculation section 17b that calculates a steering-ratio correction value required to cancel torque steer resulting from a difference in braking force and/or driving force between left and right steered wheels 10 and 11. Variable steering ratio mechanism 5 is driven based on both of the computed reference steering ratio and the computed steering-ratio correction value, thereby effectively suppressing an undesirable steering-wheel pull (steering-wheel pulling power) in clockwise or anticlockwise directions, that is, positive or negative fluctuations in steering-wheel rotation angle θs occurring owing to torque steer, without reducing the driving force applied to each of left and right steered wheels 10 and 11.

(2) Steering ratio control unit 17 also includes variable steering ratio mechanism driving section 17c. Variable steering ratio mechanism driving section 17c operates to drive the addition type variable steering ratio mechanism based on the summed value of the computed reference steering ratio and the computed steering-ratio correction value, and therefore it is possible to suitably reducing a magnitude of undesirable steering-wheel pull (steering-wheel pulling power) in clockwise or anticlockwise directions, that is, positive or negative fluctuations in steering-wheel rotation angle θs occurring owing to torque steer.

(3) Steering-ratio correction value arithmetic calculation section 17b is designed to increase the steering-ratio correction value, as the difference in braking force and/or driving force between left and right steered wheels 10 and 11 increases. Therefore, it is possible to properly change or compensate for the final steering ratio depending on the magnitude of torque steer occurring, thus effectively reducing a magnitude of undesirable steering-wheel pull (steering-wheel pulling power) in clockwise or anticlockwise directions, that is, positive or negative fluctuations in steering-wheel rotation angle θs occurring owing to torque steer.

Referring now to FIGS. 7 and 8A-8C, there is shown the first modified steering ratio control system employing a multiplication type variable steering ratio mechanism (a multiplying variable steering ratio mechanism) instead of using the previously-noted addition type variable steering ratio mechanism. Concretely, the multiplication type variable steering ratio mechanism of the first modified steering ratio control system of FIGS. 7 and 8A-8C has a speed variator located between upper and lower column shafts 3a and 3b, to convert or change a rotational speed (input speed) of upper column shaft 3a into a rotational speed (output speed different from input speed) of lower column shaft 3b. Responsively to the reference steering ratio calculated, based on both of steering-wheel rotation angle θs and vehicle speed V, by steering ratio decision section 17a, the speed variator can variably adjust the steering angular velocity of lower column shaft 3b (the output speed side) relative to upper column shaft 3a (the input speed side), so as to variably adjust a time rate of change in driver-applied steering (i.e., an angular velocity of driver-applied steering) on the basis of the reference steering ratio and thus to provide a final steering ratio characteristic indicated by the solid line in FIG. 7. More concretely, in order to adjust the relative steering angular velocity of lower column shaft 3b (the rotation angle of pinion 6 relative to steering-wheel rotation angle θs), the distance between the rotation axis of upper column shaft 3a and the rotation axis of pinion 6 (the rotation axis of lower column shaft 3b) can be variably adjusted or controlled by means of a variable-speed mechanism constructing the speed variator, for example a variable-speed belt and chain drive. As hereinafter described in detail in reference to FIGS. 7 and 8A-8C, the first modified system using the multiplication type variable steering ratio mechanism is different from the steering ratio control system of the embodiment using the addition type variable steering ratio mechanism, in that a subtracted value obtained by subtracting a steering-ratio correction value calculated by steering-ratio correction value arithmetic calculation section 17b from a reference steering ratio calculated by steering ratio decision section 17a, is set to a final steering ratio.

The operation and effects of the first modified system are hereunder described in reference to FIGS. 7 and 8A-8C.

In the same manner as the system of the embodiment using the addition type variable steering ratio mechanism, in the first modified system using the multiplication type variable steering ratio mechanism, the steering-ratio correction value increases in accordance with an increase in the difference in braking force and/or driving force between left and right steered wheels 10 and 11 (see FIG. 4). Also, the final steering ratio is given as a difference between the reference steering ratio computed and the steering-ratio correction value computed. As compared to the conventional steering ratio control system using the reference steering ratio characteristic, for the same difference in braking force and/or driving force between left and right steered wheels 10 and 11, the first modified system using the multiplication type variable steering ratio mechanism, can set the final steering ratio to a comparatively small value (see the compensated steering ratio characteristic curve indicated by the solid line in FIG. 7).

Figure 8A:
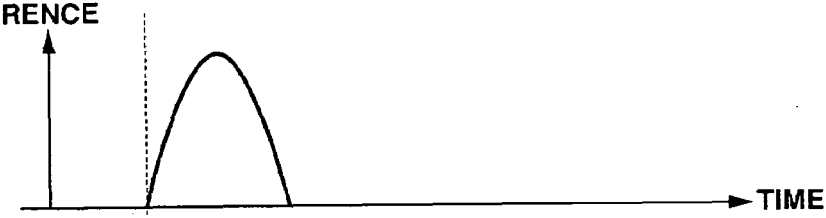
FIGS. 8A-8C are time charts showing the operation and effects of the modified system shown in FIG. 7.
Figure 8B:
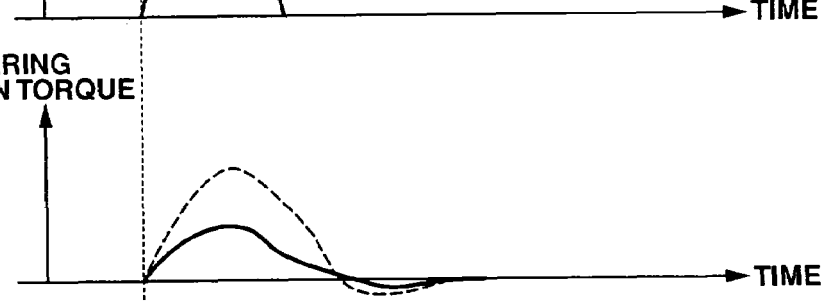
Figure 8C:
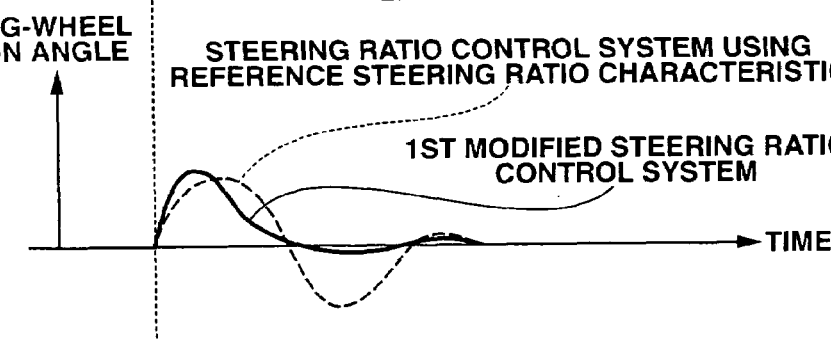

Referring to FIGS. 8A-8C, there are shown time charts explaining the operation and effects of the first modified steering ratio control system using the multiplication type variable steering ratio mechanism. In FIGS. 8A-8C, the time charts indicated by the solid line show simulation results obtained by the first modified system, whereas the time charts indicated by the broken line show simulation results obtained by the conventional steering ratio control system using the reference steering ratio characteristic. As can be seen from the time charts shown in FIGS. 8A-8C, in particular FIG. 8B, as compared to the conventional steering ratio control system using the reference steering ratio characteristic itself, in the first modified system using the multiplication type variable steering ratio mechanism it is possible to properly suppress the magnitude of steering reaction force or steering resistance or feedback torque through steering wheel 1. In this manner, by decreasingly compensating for the final steering angle, an initial fluctuation in steering-wheel rotation angle θs tends to become greater, but it is possible to easily adjust or compensate for driver-applied steering action with a comparatively small steering effort, because of such a properly-suppressed steering reaction or such a properly-suppressed feedback torque. As a result of such easy compensation for the driver-applied steering action, it is possible to more smoothly suppress an undesirable steering-wheel pull (steering-wheel pulling power) in clockwise or anticlockwise directions, that is, positive or negative fluctuations in steering-wheel rotation angle θs occurring owing to torque steer.

The first modified steering ratio control system of FIGS. 7 and 8A-8C has the following effects (4)-(5) in addition to the effect (1) brought by the system of the embodiment shown in FIGS. 1-6C.

(4) Variable steering ratio mechanism driving section 17*c* of steering ratio control unit 17 of the first modified steering ratio control system operates to drive the multiplication type variable steering ratio mechanism based on a difference obtained by subtracting the computed steering-ratio correction value from the computed reference steering ratio, and therefore it is possible to reduce or suppress a steering reaction increase (or a feedback torque increase) resulting from torque steer.

(5) Steering-ratio correction value arithmetic calculation section 17*b* is designed to increase the steering-ratio correction value, as the difference in braking force and/or driving force between left and right steered wheels 10 and 11 increases. Therefore, it is possible to more effectively reduce or suppress a steering reaction increase (or a feedback torque increase) resulting from torque steer.

Figure 9:
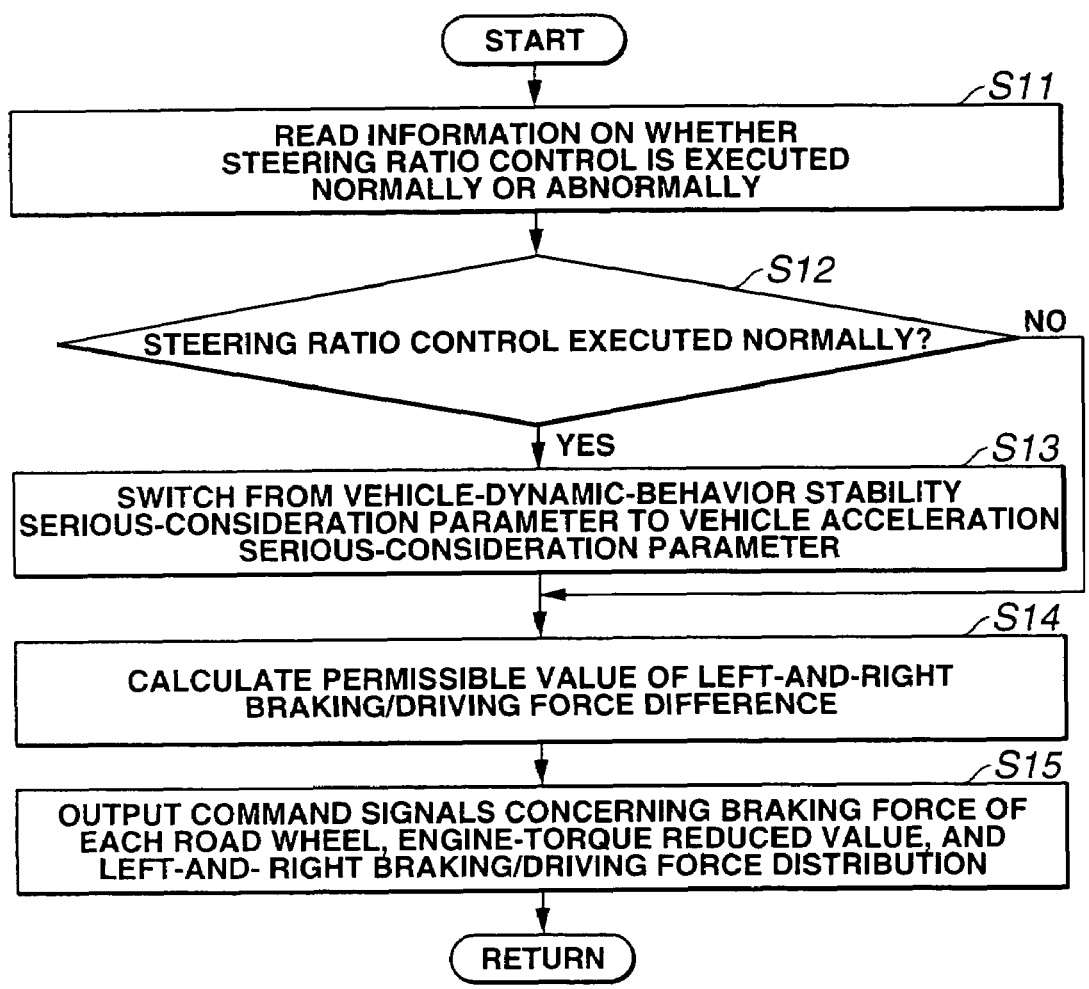
FIG. 9 is a flow chart showing a braking/driving force control routine executed within the braking/driving force control unit incorporated in the other modified steering ratio control system.

Referring now to FIGS. 9 and 10A-10E, there is shown the second modified steering ratio control system. The second modified steering ratio control system is different from the system of the embodiment shown in FIGS. 1-5, in that braking/driving force control unit 18 initiates or executes a braking/driving force control mode at which a higher priority is put on the vehicle's acceleration performance rather than the stability of vehicle dynamic behavior, by the basis of a precondition that steering ratio control is executed normally by means of steering ratio control unit 17. In the second modified steering ratio control system executing the braking/driving force control routine shown in FIG. 9, an addition-type variable steering ratio mechanism or a multiplication type variable steering ratio mechanism is used as variable steering ratio mechanism 5. The operation of the second modified steering ratio control system is hereunder described in detail in reference to the flow chart of FIG. 9. The routine of FIG. 9 is executed within braking/driving force control unit 18 as time-triggered interrupt routines to be triggered every predetermined sampling time intervals.

At step S11, information on whether steering ratio control is executed normally or abnormally by means of steering ratio control unit 17, is read.

At step S12, on the basis of the input information read at step S11, a check is made to determine whether the steering ratio control is executed normally or abnormally. When the answer to step S12 is in the affirmative (YES), that is, in a normal steering-ratio controlling state, the routine proceeds from step S12 to step S13. Conversely when the answer to step S12 is in the negative (NO), that is, in an abnormal steering-ratio controlling state, the routine proceeds from step S12 to step S14. The normal steering-ratio controlling state means that a component of steering torque equivalent to "torque steer" can be effectively decreasingly compensated for or effectively canceled by means of variable steering ratio mechanism 5 and steering ratio control unit 17 operating normally.

At step S13, a control parameter for braking/driving force control is switched from a vehicle-dynamic-behavior stability serious-consideration parameter attaching weight to the stability of vehicle dynamic behavior to a vehicle acceleration serious-consideration parameter attaching weight to the vehicle's acceleration performance. That is, in case of the flow from step S12 via step S13 to step S14 (described later), the vehicle acceleration serious-consideration parameter is selected as the control parameter for braking/driving force control. Conversely in case of the flow from step S12 directly to step S14 (described later), the vehicle-dynamic-behavior stability serious-consideration parameter is selected as the control parameter for braking/driving force control, in other words, the control parameter for braking/driving force control is held at the vehicle-dynamic-behavior stability serious-consideration parameter.

At step S14, a permissible value of left-and-right braking/driving force difference is arithmetically calculated or determined based on the selected one of the vehicle-dynamic-behavior stability serious-consideration parameter and the vehicle acceleration serious-consideration parameter.

At step S15, a command value indicative of a braking force of each of left and right steered wheels 10 and 11, a command value indicative of an engine-torque reduced value, and a command value indicative of the left-and-right braking/driving force distribution are output, so as to integratedly control braking/driving force control unit 18 and variable steering ratio mechanism 5 in combination. After step S15, the braking/driving force control routine of FIG. 9 returns to the main program.

Referring now to FIGS. 10A-10E, there are shown time charts explaining the operation and effects of the second modified steering ratio control system executable the routine of FIG. 9. In FIGS. 10A-10E, the time charts indicated by the solid line show simulation results obtained by the second modified system, whereas the time charts indicated by the broken line show simulation results obtained by the conventional steering ratio control system using the reference steering ratio characteristic. As compared to the conventional steering ratio control system using the reference steering ratio characteristic, for the same upper limit of fluctuations in steering-wheel rotation angle θs (see FIG. 10D), the second modified system, capable of switching the control parameter for braking/driving force control from a vehicle-dynamicbehavior stability serious-consideration parameter to a vehicle acceleration serious-consideration parameter in the normal steering-ratio controlling state, can set the permissible value of left-and-right braking/driving force difference to a comparatively greater value (see the timing chart indicative of the left-and-right braking/driving force difference indicated by the solid line in FIG. 10B). As a result of switching from the vehicle-dynamic-behavior stability serious-consideration parameter to the vehicle acceleration serious-consideration parameter, it is possible to increase the total driving force (indicated by the solid line in FIG. 10A) of left and right steered wheels 10 and 11 by the difference between the comparatively increased left-and-right braking/driving force difference (indicated by the solid line in FIG. 10B) and the usual left-and-right braking/driving force difference (indicated by the broken line in FIG. 10B). In other words, it is possible to decreasingly compensate for the engine-torque reduced value by the difference between the comparatively increased left-and-right braking/driving force difference and the usual left-and-right braking/driving force difference. That is, the second modified steering ratio control system can realize the enhanced vehicle's acceleration performance (see the solid line in FIG. 10E) determined based on an incremented value (see the solid line in FIG. 10C) in positive and negative fluctuations in steering reaction torque (feedback torque through steering wheel 1) created during steering ratio control.

The second modified steering ratio control system of FIGS. 9 and 10A-10E has the following effect (6) in addition to the effects (1)-(3) brought by the system of the embodiment shown in FIGS. 1-6C.

(6) Braking/driving force control unit 18 incorporated in the second modified steering ratio control system can execute a braking/driving force control mode at which a higher priority is put on the vehicle's acceleration performance rather than the stability of vehicle dynamic behavior, under a specific condition where the steering ratio control system (containing steering ratio control unit 17) is in operation and thus the steering ratio control is executed normally. Thus, it is possible to more properly enhance the vehicle's acceleration performance.

The entire contents of Japanese Patent Application No. 2004-079840 (filed Mar. 19, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A steering ratio control system of a vehicle comprising:
a variable steering ratio mechanism that variably adjusts a steering ratio of a steer angle at left and right steered road wheels to a rotation angle of a steering wheel;
a braking/driving force control unit that individually controls braking force and/or driving force of the left and right steered road wheels, the braking/driving force control unit comprising a left-and-right braking/driving force difference arithmetic calculation section that calculates a difference in braking force and/or driving force between the left and right steered road wheels; and
a steering ratio control unit comprising:
(a) a steering ratio decision section that determines a reference steering ratio based on a driving state of the vehicle;
(b) a variable steering ratio mechanism driving section that drives the variable steering ratio mechanism depending on the reference steering ratio based on the vehicle's driving state; and
(c) a steering-ratio correction value arithmetic-calculation section that calculates a steering-ratio correction value based on the difference calculated by the left-and-right braking/driving force difference arithmetic calculation section, for canceling torque steer resulting from a difference in braking force and/or driving force between the left and right steered road wheels;
wherein the variable steering ratio mechanism driving section is adapted to determine a final steering ratio based on both of the reference steering ratio and the steering-ratio correction value to drive the variable steering ratio mechanism responsively to the final steering ratio.

2. The steering ratio control system as claimed in claim 1, wherein:
the variable steering ratio mechanism comprises a summing variable steering ratio mechanism that provides the final steering ratio by adding an assisted steering-wheel angle determined based on the reference steering ratio to the steering-wheel rotation angle; and
the variable steering ratio mechanism driving section determines the final steering ratio based on a summed value of the reference steering ratio and the steering-ratio correction value to drive the variable steering ratio mechanism responsively to the final steering ratio determined as the summed value of the reference steering ratio and the steering-ratio correction value.

3. The steering ratio control system as claimed in claim 1, wherein:
the variable steering ratio mechanism comprises a multiplying variable steering ratio mechanism having a speed variator capable of converting an input speed of the steering wheel into an output speed different from the input speed for variably adjusting, based on the reference steering ratio, an angular velocity of driver-applied steering; and
the variable steering ratio mechanism driving section determines the final steering ratio based on a subtracted value obtained by subtracting the steering-ratio correction value from the reference steering ratio to drive the variable steering ratio mechanism responsively to the final steering ratio determined as the subtracted value obtained by subtracting the steering-ratio correction value from the reference steering ratio.

4. The steering ratio control system as claimed in claim 1, wherein:
the steering-ratio correction value arithmetic-calculation section increasingly compensates for the steering-ratio correction value, as the difference in braking force and/or driving force between the left and right steered road wheels increases.

5. The steering ratio control system as claimed in claim 1, wherein:
the braking/driving force control unit executes a braking/driving force control mode at which a higher priority is put on a vehicle's acceleration performance, under a predetermined condition where steering ratio control is executed normally by the steering ratio control unit.

6. The steering ratio control system as claimed in claim 1, wherein:
the driving state of the vehicle includes at least a vehicle speed.

7. The steering ratio control system as claimed in claim 1, wherein:

the driving state of the vehicle includes a vehicle speed and the steering-wheel rotation angle.

8. A steering ratio control system of a vehicle comprising:
a variable steering ratio mechanism for variably adjusting a steering ratio of a steer angle at left and right steered road wheels to a rotation angle of a steering wheel;
braking/driving force control means for individually controlling braking force and/or driving force of the left and right steered road wheels, the braking/driving force control means comprising a left-and-right braking/driving force difference arithmetic calculation means for calculating a difference in braking force and/or driving force between the left and right steered road wheels; and
steering ratio control means comprising:
(a) steering ratio decision means for determining a reference steering ratio based on a driving state of the vehicle;
(b) variable steering ratio mechanism driving means for driving the variable steering ratio mechanism depending on the reference steering ratio based on the vehicle's driving state; and
(c) steering-ratio correction value arithmetic-calculation means for calculating a steering-ratio correction value based on the difference calculated by the left-and-right braking/driving force difference arithmetic calculation means, for canceling torque steer resulting from a difference in braking force and/or driving force between the left and right steered road wheels; wherein
the variable steering ratio mechanism driving means determines a final steering ratio based on both of the reference steering ratio and the steering-ratio correction value to drive the variable steering ratio mechanism responsively to the final steering ratio.

9. A method of controlling a steering ratio of a vehicle employing a variable steering ratio mechanism capable of variably adjusting the steering ratio of a steer angle at left and right steered road wheels to a rotation angle of a steering wheel, and a braking/driving force control unit capable of individually controlling braking force and/or driving force of the left and right steered road wheels, the method comprising:
calculating a difference in braking force and/or driving force between the left and right steered road wheels;
determining a reference steering ratio based on a driving state of the vehicle;
calculating a steering-ratio correction value based on the calculated difference for canceling torque steer resulting from a difference in braking force and/or driving force between the left and right steered road wheels;
determining a final steering ratio based on both of the reference steering ratio and the steering-ratio correction value; and
driving the variable steering ratio mechanism responsively to the final steering ratio.

10. The method as claimed in claim 9, wherein the reference steering ratio is determined based on both of a vehicle speed and the steering-wheel rotation angle.

11. The method as claimed in claim 10, further comprising:
determining whether a steering ratio control system is in a normal steering-ratio control state where a component of steering torque equivalent to the torque steer can be canceled via the variable steering ratio mechanism;
selecting a vehicle acceleration serious-consideration parameter attaching weight to a vehicle's acceleration performance as a control parameter for braking/driving force control, when the steering ratio control system is in the normal steering-ratio control state;
selecting a vehicle-dynamic-behavior stability serious-consideration parameter attaching weight to a stability of vehicle dynamic behavior as the control parameter for braking/driving force control, when the steering ratio control system is out of the normal steering-ratio control state; and
executing the braking/driving force control based on a selected parameter of the vehicle acceleration serious-consideration parameter and the vehicle-dynamic-behavior stability serious-consideration parameter.

12. The method as claimed in claim 11, further comprising:
determining a permissible value of the difference in braking force and/or driving force between the left and right steered road wheels based on the selected parameter; and
integratedly controlling the braking/driving force control unit and the variable steering ratio mechanism responsively to the permissible value of the difference in braking force and/or driving force determined based on the selected parameter.

13. The method as claimed in claim 10, wherein:
the steering-ratio correction value increases, as the difference in braking force and/or driving force between the left and right steered road wheels increases.

14. The method as claimed in claim 10, wherein:
the variable steering ratio mechanism comprises a summing variable steering ratio mechanism that provides the final steering ratio by adding an assisted steering-wheel angle determined based on the reference steering ratio to the steering-wheel rotation angle; and
the final steering ratio is determined based on a summed value of the reference steering ratio and the steering-ratio correction value to drive the variable steering ratio mechanism responsively to the final steering ratio determined as the summed value of the reference steering ratio and the steering-ratio correction value.

15. The method as claimed in claim 10, wherein:
the variable steering ratio mechanism comprises a multiplying variable steering ratio mechanism having a speed variator capable of converting an input speed of the steering wheel into an output speed different from the input speed for variably adjusting, based on the reference steering ratio, an angular velocity of driver-applied steering; and
the final steering ratio is determined based on a subtracted value obtained by subtracting the steering-ratio correction value from the reference steering ratio to drive the variable steering ratio mechanism responsively to the final steering ratio determined as the subtracted value obtained by subtracting the steering-ratio correction value from the reference steering ratio.

* * * * *